United States Patent [19]

Stirling

[11] 3,854,283
[45] Dec. 17, 1974

[54] INTERNAL COMBUSTION STEAM GENERATING SYSTEM

[76] Inventor: Robert L. Stirling, 108 Edgar Ave., Brookhaven, N.Y. 11719

[22] Filed: Oct. 25, 1973

[21] Appl. No.: 409,695

[52] U.S. Cl. .............. 60/39.17, 60/39.55, 60/39.19, 60/39.18 B
[51] Int. Cl. .............................................. F02c 7/02
[58] Field of Search ......... 60/39.18 B, 39.05, 39.55, 60/39.54, 39.17, 39.19

[56] References Cited
UNITED STATES PATENTS

| | | | |
|---|---|---|---|
| 2,357,041 | 8/1944 | Woolley .......................... | 60/39.18 B |
| 2,663,144 | 12/1953 | Norström et al. ............... | 60/39.18 B |
| 3,335,565 | 8/1967 | Aguet .................................. | 60/39.05 |
| 3,461,667 | 8/1969 | Aguet................................ | 60/39.18 R |
| 3,708,976 | 1/1973 | Berlyn................................ | 60/39.05 |
| 3,756,029 | 9/1973 | Aguet ................................ | 60/39.05 |
| 3,772,881 | 11/1973 | Lange................................ | 60/39.18 B |

FOREIGN PATENTS OR APPLICATIONS

| | | | |
|---|---|---|---|
| 1,372,501 | 8/1964 | France ............................. | 60/39.18 B |

Primary Examiner—Carlton R. Croyle
Assistant Examiner—Warren Olsen
Attorney, Agent, or Firm—Joseph F. Padlon

[57] ABSTRACT

An arrangement in which compressed air and fuel are intermixed and burned to release the energy in the fuel. The heat resulting from the combustion of fuel and compressed air is used to generate superheated steam. The superheated steam and products of combustion are intermixed within the combustion chamber, and the mixed gases are passed through a positive displacement motor and to a variable displacement motor which converts the energy in the gases into mechanical energy. A valve between the positive displacement motor and the second motor may be used to interrupt the mechanical output of the second motor, while retaining the gases within the combustion chamber in ready state for resuming the mechanical output upon subsequently displacing the valve to an open position.

10 Claims, 2 Drawing Figures

PATENTED DEC 17 1974      3,854,283

INTERNAL COMBUSTION STEAM GENERATING SYSTEM

BACKGROUND OF THE INVENTION

Internal combustion engines are known in the art, particularly for driving motor vehicles. Such engines, however, continue to operate and consume fuel while the vehicle is held in an idling state. Thus, during such idling state of the vehicle, during which time the vehicle is standing still, the engine is operating with moving parts while combustion takes place within the internal combustion chambers or cylinders of the engine.

Such driving engines, as known in the art, are inefficient because they consume fuel during a time interval when no beneficial output from the fuel consumption is had. The conventional engines, furthermore, while rotating and exercising the movable parts, applies unnecessary wear to the moving parts, and thereby decreases the operating life of the engine.

The conventional engines, furthermore, are complex in design, inefficient in their operation, and costly to maintain.

SUMMARY OF THE INVENTION

It is an object of the present invention to provide an arrangement in which the combustion of fuel and compressed air is used to generate superheated steam from which mechanical energy is derived through a rotary displacement motor.

Another object of the present invention is to provide an arrangement of the foregoing character which does not consume fuel when the mechanical output is interrupted.

A further object of the present invention is to provide an arrangement, as described, which retains the products of combustion in readiness for conversion into mechanical energy during the time interval when the mechanical output is interrupted.

A still further object of the present invention is to provide a power generating system which is efficient in operation, and compact in construction.

The objects of the present invention are achieved by providing an air compressor which supplies compressed air to an internal combustion chamber and steam generator. The compressed air is intermixed with fuel sprayed into the chamber and the fuel-air mixture is burnt. The resultant heat from the combustion process is used to generate superheated steam within a coil mounted directly within the combustion chamber. Water is supplied to the coil continuously while the shaft operating the air compressor is rotating. The superheated steam is, thereafter, intermixed with the products of combustion at the bottom of the combustion chamber, and the resultant gaseous mixture is applied to a variable displacement motor, by way of a gas outlet motor. The motor converts the energy in the gases, into mechanical energy in the form of a rotating shaft. The air compressor and the motor are mechanically linked, so that they are operated simultaneously or held stationary at the same time. The linkage between the air compressor and the outlet motor allows for different operational speeds of the compressor and the pump to provide for the different volumetric flow of compressed air and output gases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
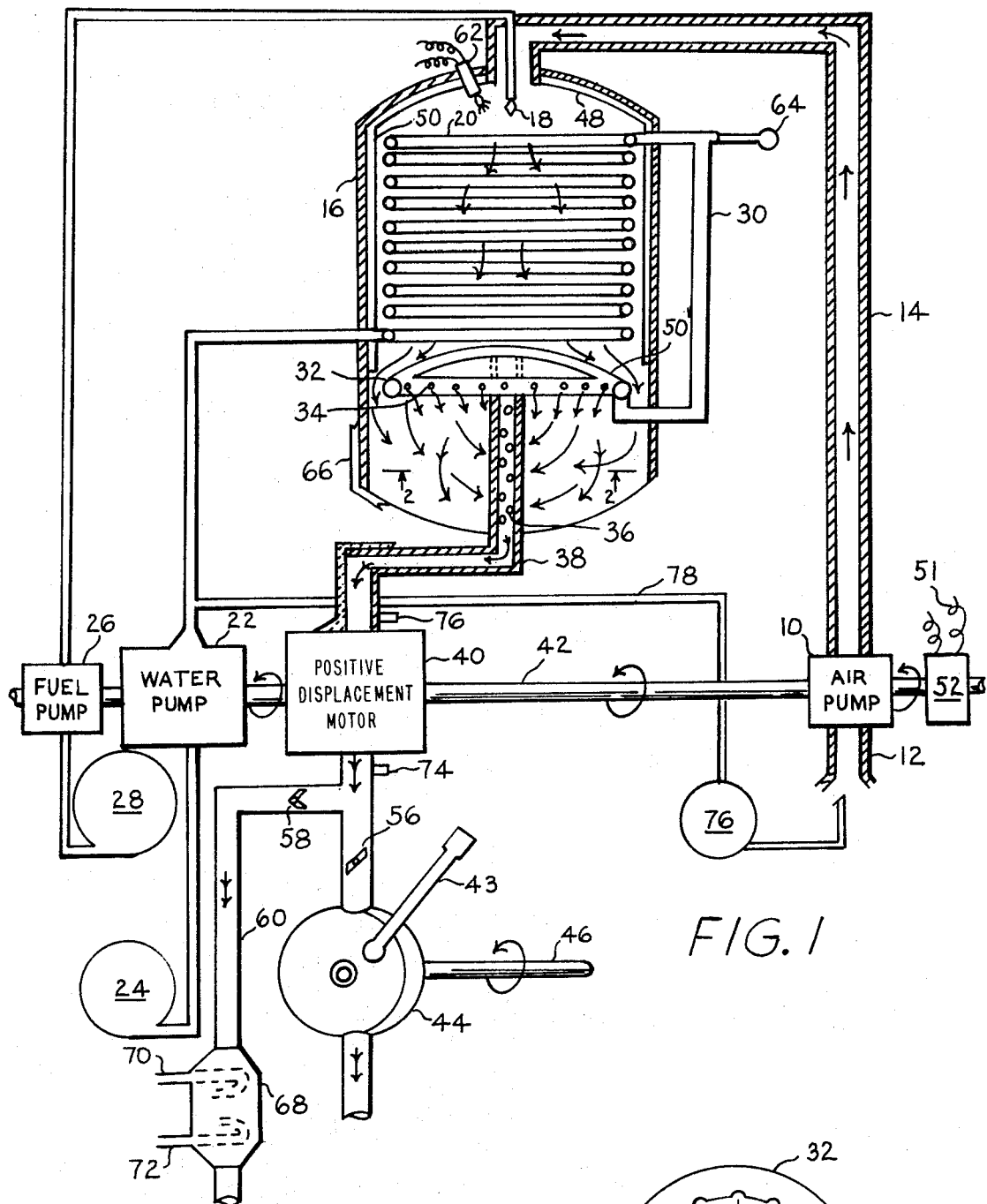
FIG. 1 is a schematic diagram of the internal combustion steam generating power arrangement, and shows the construction of the combustion chamber in conjunction with the basic operating elements, in accordance with the present invention.
Figure 2:
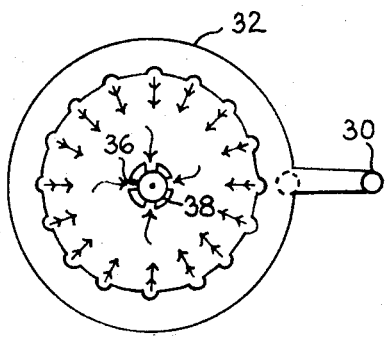
FIG. 2 is a plan view taken along line 2—2 in FIG. 1.

Referring to the drawing and in particular to FIG. 1, an air compressor 10 draws air into its inlet 12 and supplies compressed air at its output into the line 14. The line 14 connects to a chamber 16 for supplying compressed air into this chamber.

The compressed air supplied by the line 14, is mixed with fuel sprayed into the chamber through the spray head 18. Upon ignition of the fuel-air mixture within the chamber 16, heat is generated, and this heat is used to convert water supplied to the coil 20, into superheated steam.

The coil 20 is mounted directly within the interior of the combustion chamber 16 and is supplied with water from a pump 22. A water reservoir 24 feeds the pump 22. Fuel to the spray head 18 is supplied by a fuel pump 26 which is, in turn fed by a fuel reservoir 28.

After ignition and burning of the fuel and air, the products of combustion flow downward in the chamber 16, and past the coil 20. The superheated steam generated within the coil 20 from the heat of combustion, rises to the top of the coil and flows into the transfer line 30. This line 30 connects to an outlet ring 32 below the bottom of the coil 20. The steam emerges from the outlet ring 32, through openings 34, and is intermixed with the products of combustion at the bottom of the chamber 16. The gaseous mixture that results, enters openings 36 of an exit line 38, and is directed to a gas outlet positive displacement motor 40.

In passing through the motor 40, flow energy of the gaseous mixture is partially converted into an output shaft rotation which operates the compressor 10, as well as the water pump 22 and fuel pump 26. Mechanical linkage 42 interconnects the outlet motor 40 with the compressor 10, as well as the water pump 22 and fuel pump 26.

After passing through the outlet motor 40, the gases are directed to a variable displacement motor 44, which serves to convert the flow energy of the gases into useful driving mechanical energy at the output shaft 46, of the motor 44. The variable displacement motor 44 is of conventional construction and well known in the art, and is for this reason not described further. The motor 40, air compressor 10, water pump 22 and fuel pump 26 are also all components well known in the art and commercially available.

The top interior wall of the combustion chamber 16, has a parabolic-shaped surface 48 which serves to reflect the heat resulting from the combustion. For the same purpose, a reflector 50' is provided at the bottom of coil 20 to further aid in reflecting heat onto the coil so as to generate superheated steam. The interior lining of the chamber 16 is made of refractory material. This refractory lining serves to reflect heat towards the interior of the chamber, and inhibits transfer and dissipation of heat from the chamber.

To start operation of the arrangement, in accordance with the present invention, a valve 56 in the line between the motor 40 and motor 44 is held in closed position. A second valve 58 in a bypass line 60 is held in partially open position. An electric motor 52 having leads 51 connected to a battery, for example, is operated to rotate the linkage 42 which interconnects the rotary components 52, 10, 40, 22 and 26. The electric motor 52 is used only for starting purposes, and once operation of the power generating arrangement has been started, in accordance with the present invention, no further power is supplied to the motor 52.

The operation of the starting electric motor 52 operates the air compressor 10 and supplies, thereby, compressed air into the chamber 16. At the same time, the operation of the starting motor 52 also operates the fuel pump 26 and the water pump 22. The fuel pump thereby supplies a spray of fuel into the chamber 16, and upon igniting the mixture of fuel and compressed air by the spark plugs 62, for example, combustion is obtained and heat is released within the chamber 16. The spark plug 62 may be connected to a battery, for example, through a starting switch, not shown.

With combustion taking place and steam being generated in the coil 20, pressure is built up within the chamber 16. With valve 56 in closed position, the gaseous products from the line 38 can escape only through the partially opened valve 58, and as a result, pressure within the chamber 16 increases from the instant of starting the motor 52. The gaseous flow on its way to the outlet valve 58 will pass thru outlet motor 40. Its passage will help to rotate pump. As flow increases, the turning of the motor will be sustained by the flow, and electric motor 52 can be disconnected as its use will no longer be necessary. The generating circuit will now be self-sustaining, and under control of the two operating valves 58 and 56.

When the pressure has increased to a predetermined level as indicated by a gauge 64, for example, the valve 56 is opened and gaseous flow is permitted to the motor 44. The gaseous flow through the motor 40 causes, thereby, rotation of this motor and consequently rotation of the linkage 42. Speed of rotation of this motor and linkage 42 will be in direct proportion to the speed of the gaseous flow thru motor 40.

As a result, the air compressor 10, and fuel pump 26 as well as water pump 22 are simultaneously rotated with the rotation of the motor 40 at a speed in direct proportion to the gaseous flow. With their operation, fresh compressed air is supplied by the pump 10 in combination with fuel from the pump 26, their pumping capacities being in direct proportion to their speed, so that combustion intensity can be maintained at a rate which will exactly match the gaseous power flow thru motor 40 for as long as the valve 56 is held in open position, or, for example, in partial position to regulate power flow.

Thus, by supplying fuel into the hot chamber 16 to which compressed air is supplied by the compressor 10, continuous burning and ignition of the fuel and air mixture takes place, similar to the reaction within a Diesel engine. During such continuous burning of the fuel and air, the spark plug 62 is not required to be operated. The output shaft 46 of the motor 44 may, for example, be connected to a load, such as a motor vehicle.

The series of events described (starting Page 8, line 18) by opening valve 56, will occur also by the operation of valve 58. The flow will be directed to bypass line 60 and heat exchanger 68. This use of valve 58 will be necessary when it is desired to use heat exchanger 68 while it is not desired to use mechanical power equipment 44 and shaft 46. Also it will be possible to use both valves 56 and 58 at the same time when it is required to use mechanical energy from shaft 46 and heat from the heat exchange system 68 having water inlet 70 and water outlet 72. This heat exchanger 68 may be used, for example, to heat air within the motor vehicle during periods of cold weather.

When it is desired to interrupt the power flow, as when the motor vehicle is to be temporarily stopped, the valve 56 is closed so that no further exhaust gases can flow through the motor 40. This causes the motor 40 to be held stationary and, at the same time, to hold stationary the components 10, 22 and 26. As a result, the hot gaseous mixture within the chamber 16 is retained therein and ready for use until the valve 56 becomes subsequently again opened. Once this valve 56 is reopened, the gas flow can resume through the motor 40 and thereby continue to rotate this motor and at the same time supply compressed air and fuel to the chamber 16, through the linkage 42. During the time interval that the valve 56 is temporarily closed, the gaseous products within the chamber 16 are maintained in their hot and compressed state. The chamber 16 is covered with an exterior lining 66 which assures negligible heat transfer from the chamber 16 during the inoperative interval during which the valve 56 is closed. An essential feature, in accordance with the present invention, is that during the interval when the valve 56 is closed and the gaseous products are held within the chamber 16, the linkage 42 does not rotate, and all operative parts of the power generating system are not moving. During the same interval, no further fuel is supplied to the chamber 16, and thereby fuel is not wasted should the output shaft 46 be used to drive a motor vehicle, for example, and the vehicle is temporarily halted. Thus, whereas fuel is consumed in the conventional motor vehicle while in the idling state, no such fuel is consumed when the output shaft 46 is temporarily halted during a comparable period of time.

An additional feature of this invention is the way the ingredients necessary to generate the gaseous flow are delivered to the combustion chamber. The rate of delivery from the supply pumps being governed by the speed of the generator outlet motor, which is determined by the gaseous power flow. The intensity of this gaseous flow is in direct proportion to the power demands of the mechanical equipment or heat exchanger. Gaseous flow passing through this equipment, will vary in accordance with the energy requirements. Variations in flow intensity will influence the speed of generator outlet motor, with its interconnected supply pumps, thus a form of self regulation will be obtained.

Check valves 74 and 76 may be inserted at the outlet and inlet sides, respectively of the motor 40, to prevent shock application to the system when starting by the motor 52.

To control the temperature of combustion and thereby the formation of pollutants, water may be injected by means of the injector 76 into the inlet 12 of the air compressor 10. The injector 76 may be fed directly from the water pump 22 by means of the line 78.

Although various types of fuel may be used for combustion within the chamber 16, hydrogen is preferable because it will combine to become water. A regulating lever 43 on the motor 44 may be manually operated, for example, to operate the power system in accordance with the load requirements at the output shaft 46.

The air compressor 10 may be of the rotary vane type of unit which has a volumetric displacement substantially smaller than the volumetric displacement of the motor unit 40. The latter may also be of the rotary vane displacement type. The difference in volumetric displacement between the compressor 10 and motor 40, for example, results from the difference in volume occupied by the compressed air within the line 14, and the hot compressed gaseous products within the line 38. The difference in the displacement between the compressor 10, and motor 40 may be taken into account by suitable gearing between the pump 10 and motor 40. Such gearing may, for example, be installed directly within the compressor 10 or the motor 40, and driven by the interconnecting linkage 42.

It will be understood that each of the elements described above, or two or more together, may also find a useful application in other types of energy conversion systems differing from the types described above.

While the invention has been illustrated and described as embodied in energy conversion systems, it is not intended to be limited to the details shown, since various modifications and structural changes may be made without departing in any way from the spirit of the present invention.

I claim:

1. An energy conversion arrangement, comprising in combination, a combustion chamber; a source of compressed air connected to said chamber; a source of fuel connected to said chamber and mixed with said compressed air for combustion; a source of water and containing means in said chamber for receiving water to be converted into steam by the combustion of said fuel and air, said containing means isolating said water from contact with the interior of said combustion chamber and from contact with the products of combustion, said steam being released from said container means and passed into the interior of said chamber for intermixing with the products of combustion within said chamber; ring-shaped means for distributing said steam about the interior of said chamber for intermixing substantially uniformly with the products of combustion; first conversion means connected to the output of said chamber for receiving the mixture of steam and products of combustion and converting partially the energy thereof into mechanical energy; means interconnecting said first conversion means with said sources of compressed air, fuel and water whereby all said sources are operated simultaneously with the operation of said first conversion means; second conversion means connected to said first conversion means for converting into mechanical energy the remaining available energy of said steam and products of combustion from said first conversion means; and valve means between said first and second conversion means, said first and second conversion means being operated when said valve means is in open position, said first and second conversion means being held stationary in inoperative position when said valve is in closed position, said mixture of steam and products of combustion having a substantially constant energy content for a predetermined time interval during which said first and second conversion means are in inoperative position with said valve in closed position, said mixture of steam and products of combustion transferring energy to said first and second conversion means upon return of said valve means to said open position from said closed position.

2. The arrangement as defined in claim 1 including electric motor means connected to said interconnecting means for starting the process within said combustion chamber.

3. The arrangement as defined in claim 1 including parabolic reflector surfaces within the interior top and bottom of said combustion chamber.

4. The arrangement as defined in claim 1 including means connected to said source of fuel for spraying fuel into said chamber.

5. The arrangement as defined in claim 1 wherein said means for receiving water for conversion into steam comprises a water coil.

6. The arrangement as defined in claim 1 including bypass means between said first conversion means and said second conversion means for partially bypassing the products from said first conversion means.

7. The arrangement as defined in claim 1 including spark plug means for igniting said fuel and compressed air within said chamber when starting the combustion process.

8. The arrangement as defined in claim 1 including water injection means connected to said source of compressed air for injecting a predetermined quantity of water into said compressed air.

9. The arrangement as defined in claim 6 including heat exchanger means connected to said bypass means.

10. The arrangement as defined in claim 1 including refractory lining means on the interior wall of said combustion chamber for reflecting the heat generated by the combustion process and directing the reflected heat upon said means for converting water into steam.

* * * * *